US006196565B1

(12) United States Patent
Chubbuck

(10) Patent No.: US 6,196,565 B1
(45) Date of Patent: Mar. 6, 2001

(54) WHEELCHAIR WITH AEROBIC ATTACHMENT

(76) Inventor: Joseph D. Chubbuck, 5999 Lower Lawrence St., Rome, NY (US) 13440

(*) Notice: Subject to any disclaimer, the term of this patent is extended or adjusted under 35 U.S.C. 154(b) by 0 days.

(21) Appl. No.: 09/235,853

(22) Filed: Jan. 22, 1999

Related U.S. Application Data

(63) Continuation-in-part of application No. 09/146,780, filed on Sep. 4, 1998.

(51) Int. Cl.[7] .............................. B62M 1/04; B62M 5/00

(52) U.S. Cl. .................. 280/255; 280/304.1; 297/DIG. 4

(58) Field of Search ............................. 280/304.1, 250.1, 280/252, 253, 255, 258, 288.4; 297/DIG. 4, 423.25, 423.37; 403/100, 101

(56) References Cited

U.S. PATENT DOCUMENTS

| | | | | |
|---|---|---|---|---|
| 1,688,024 | | 10/1928 | Scholer . | |
| 1,763,250 | | 6/1930 | Nettles . | |
| 1,876,700 | * | 9/1932 | Lee | 280/253 |
| 2,368,142 | * | 1/1945 | Kelley | 280/250.1 |
| 3,430,982 | | 3/1969 | Despain et al. | 280/255 |
| 4,077,648 | | 3/1978 | Seul | 280/236 |
| 4,351,406 | | 9/1982 | Lay | 180/65.2 |
| 4,527,579 | * | 7/1985 | Knotter et al. | 403/100 |
| 4,705,284 | * | 11/1987 | Stout | 280/250.1 |
| 4,762,332 | * | 8/1988 | Seol | 280/255 |
| 4,770,467 | * | 9/1988 | Zinn | 297/423.37 |
| 4,993,732 | | 2/1991 | Wedemeyer | 280/250.1 |
| 5,066,032 | * | 11/1991 | Van Vooren et al. | 280/304.1 |
| 5,273,304 | | 12/1993 | Berkheimer | 280/304.1 |
| 5,280,937 | | 1/1994 | Needham | 280/259 |
| 5,324,060 | | 6/1994 | Van Vooren et al. | 280/304.1 |
| 5,378,041 | * | 1/1995 | Lee | 280/250.1 |
| 5,401,045 | * | 3/1995 | Foerster et al. | 280/250.1 |
| 5,501,476 | | 3/1996 | Howell et al. | 280/230 |
| 5,501,480 | * | 3/1996 | Ordelman et al. | 280/250.1 |
| 5,522,644 | * | 6/1996 | Peek | 297/423.37 |
| 5,624,199 | * | 4/1997 | Cheng | 403/100 |
| 5,709,631 | | 1/1998 | Kleinsasser | 482/51 |

FOREIGN PATENT DOCUMENTS

| | | | | |
|---|---|---|---|---|
| 3624797 | * | 1/1988 | (DE) | 280/252 |
| 2127111 | * | 4/1984 | (GB) | 280/252 |

* cited by examiner

*Primary Examiner*—Frank Vanaman
(74) *Attorney, Agent, or Firm*—Wall Marjama & Bilinski

(57) ABSTRACT

A wheelchair having a therapeutic unit attached thereto that contains an auxiliary drive wheel mounted in a frame beneath the chair seat. A pair of leg operated levers are connected to the auxiliary drive wheel by a drive system so that reciprocating the levers causes the auxiliary drive wheel to rotate. The levers contain forwardly extended arms that are hinged to move laterally to one side or the other of the chair seat thus permitting easy ingress and egress from the chair. The auxiliary drive wheel can be raised by one seated in the chair so that the therapeutic value of the system can be realized while the chair is in a stationary position.

15 Claims, 5 Drawing Sheets

WHEELCHAIR WITH AEROBIC ATTACHMENT

BACKGROUND OF THE INVENTION

This application is a continuation in part of copending U.S. application Ser. No. 09/146,780 filed Sep. 4, 1998, entitled Aerobic Wheelchair Attachment in the name of Joseph Chubbuck.

This invention relates to a wheelchair for providing a patient with the capability to exercise therapeutically his or her legs and lower body while seated in the chair. More specifically, this invention relates to a wheelchair that is equipped with a therapeutic exercising device that is compact and will not impede a patient's ability to easily get in and out of the chair.

Oftentimes, patients are unable to walk due to post-operative recoveries, injuries, infirmaries or the like, and are thus confined to a wheelchair for relatively long periods of time. As a consequence, the patients' unused muscles become weakened and the lower body, in particular, loses strength. When the recovery period is lengthy or not possible, the patient is required to attend therapy on a regular basis. This type of treatment is not only expensive, but also time consuming in that the patient usually must be transported from the place of confinement to the therapist's office. This, in turn, can, and often does, result in missed appointments due to weather, lack of help or transportation or simply poor health. Under these adverse conditions, a patient will lose the desire to continue in therapy and his or her condition will worsen rather than improve.

Many different wheelchairs are found in the prior art that are designed to provide exercise to a patient while seated in the chair. In U.S. Pat. No. 4,993,732, a wheelchair is disclosed which has a manual drive system that is operated through means of a pair of hand operated levers. The levers are reciprocated by the patient while seated in the chair and the motion translated to the drive wheels through a suitable linkage, to propel the chair in a desired direction. Although this device works well to provide exercise for the patient's upper body, it has no therapeutic value in relation to the patient's lower body which, in most cases, is the part of the body which most requires exercise.

In U.S. Pat. No. 5,273,304, there is disclosed a leg powered attachment for a conventional wheelchair. The device is equipped with a single drive wheel that is driven by pedals, much like a child's tricycle. The pedal unit is attached to the main frame of the chair and protrudes well forward of the chair seat to provide ample leg access to the pedals and sufficient room to turn the drive wheel. As anyone who has pedaled a tricycle knows, pedaling this type of device can be tiring and overtaxing, particularly for a person who is not physically well. The forwardly protruding pedal wheel makes ingress and egress from the chair extremely difficult. In addition, because of the excessive length of the pedal wheel unit, the maneuverability of the chair is seriously impeded and its turning radius is greatly increased.

A similar pedal wheel attachment for a wheelchair is disclosed in U.S. Pat. No. 5,280,937 where the direct pedal driver is replaced with a chain and sprocket drive system. Although the chain and sprocket drive offers some improvement in the amount of energy that must be expended in propelling the chair, here again because of the size and complexity of the drive system, getting into and out of the chair is very difficult, particularly for a patient with infirmities. Additionally, maneuverability of the chair is limited and the chair cannot be effectively used in a confined space to provide meaningful exercise. A similar sprocket and chain driven device is also disclosed in U.S. Pat. No. 5,324,060.

SUMMARY OF THE INVENTION

It is a primary object of the present invention to improve wheelchairs by providing the chair with a compact therapeutic system that will not impede the user's ability to get into or out of the chair or adversely effect the chair's mobility and maneuverability.

A further object of the present invention is to provide a compact therapeutic exercising device for a wheelchair that can be adjusted by a patient seated in the chair to match the level of exercise to the patient's physical capabilities.

Another object of the present invention is to provide a modular exercising device that can be attached without modification to a wide number of existing wheelchairs.

Yet another object of the present invention is to provide a compact therapeutic exercising attachment for a wheelchair that can be used to propel the chair or, at the option of a patient seated in the char, easily changed to a non-propelling mode of operation for use in in-place therapeutic exercising.

A still further object of the present invention is to improve the quality of life of a patient that is confined to a wheelchair by providing a therapeutic exercising device that can be used while the patient is seated in the chair.

These and other objects of the present invention are attained by a wheelchair having a main frame for supporting a seat, a pair of main hand operated drive wheels and standard brackets mounted upon the front of the frame for removably supporting conventional leg rests. An auxiliary frame is mounted upon the brackets that contains a single smaller auxiliary drive wheel located beneath the seat. A pair of leg operated levers are connected to the auxiliary drive wheel through a drive system so that when the levers are reciprocated in a general vertical plane, the auxiliary drive wheel is caused to rotate and thus propel the chair forwardly. Each lever contains a forwardly extended arm that is pivotally mounted in assembly so that the lever arms can be rotated to one side or the other of the seat thus providing easy and safe passage into and out of the chair seat. The auxiliary frame is equipped with a readily accessible actuator that can be pushed downwardly by a patient seated in the chair to lock the auxiliary drive wheel in a raised position whereby the patient can exercise in a stationary or in-place position. A similarly readily accessible brake system is mounted in the auxiliary frame that can be adjustably set by the patient while seated in the chair to place a drag force on the auxiliary drive wheel so that the patient can set the level of exercise to his or her physical capabilities.

BRIEF DESCRIPTION OF THE DRAWING

For a better understanding of these and other objects of the present invention, reference will be made to the following detailed description of the invention which is to be read in association with the accompanying drawings, wherein.

DETAILED DESCRIPTION OF THE INVENTION

Figure 1:
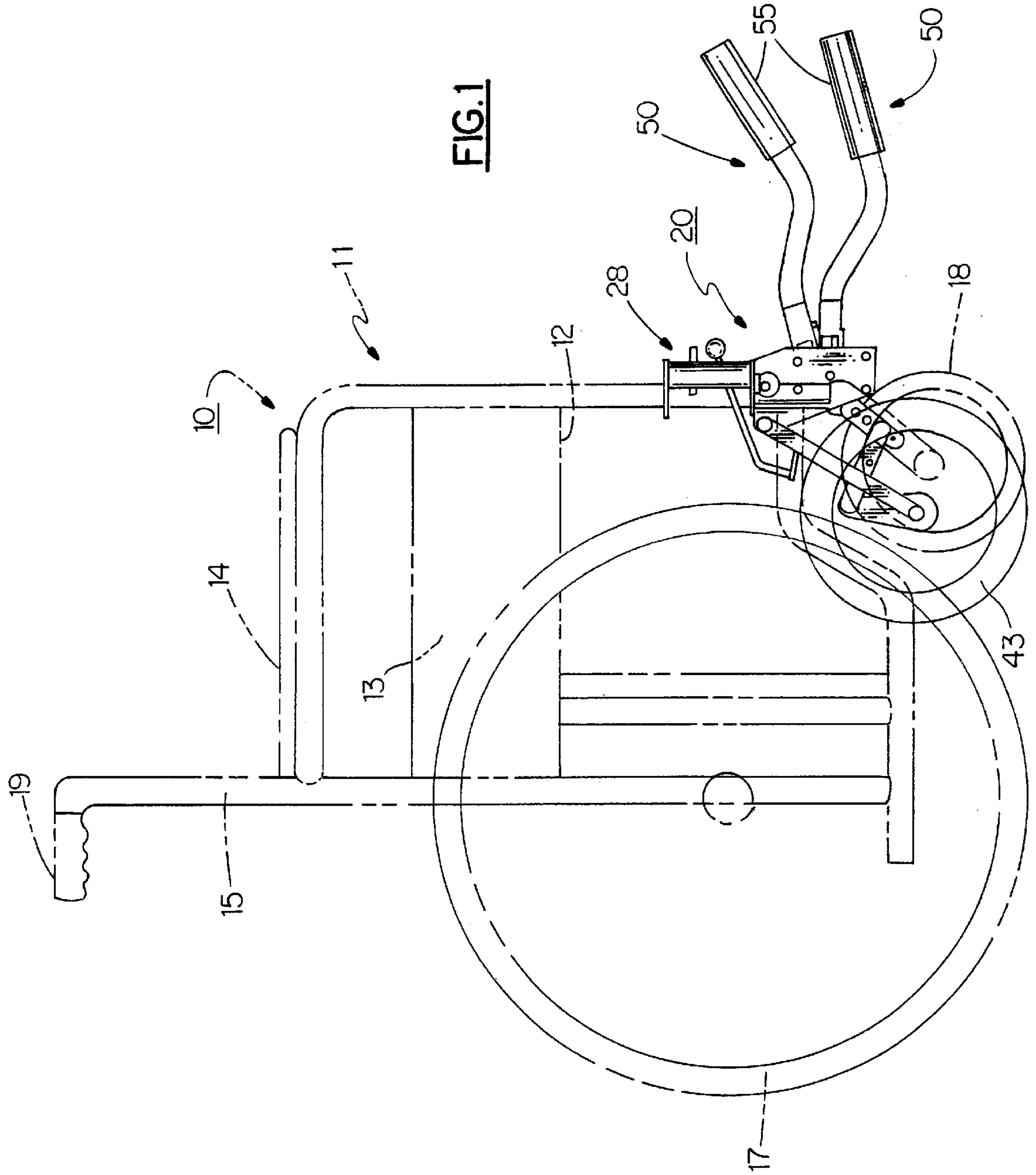
FIG. 1 is a side elevation of a wheelchair that is equipped with therapeutic apparatus embodying the present invention.

Turning initially to FIG. 1, there is illustrated, in phantom outline, a wheelchair, generally referenced 10, of conventional construction. The chair includes a tubular metal main frame 11 that supports a seat 12 having side guards 13. Arm rests 14 and a backrest 15 are also provided for the patient's safety and comfort. A pair of large manually operated drive wheels 17 are rotatably mounted in the back of the main frame and a pair of casters 18 are mounted in the front part of the frame which assists in maneuvering the chair. A pair of hand grips 19 are also mounted in the top back part of the frame which permits a person standing behind the chair to propel and maneuver the chair, if such assistance is required.

Figure 2:
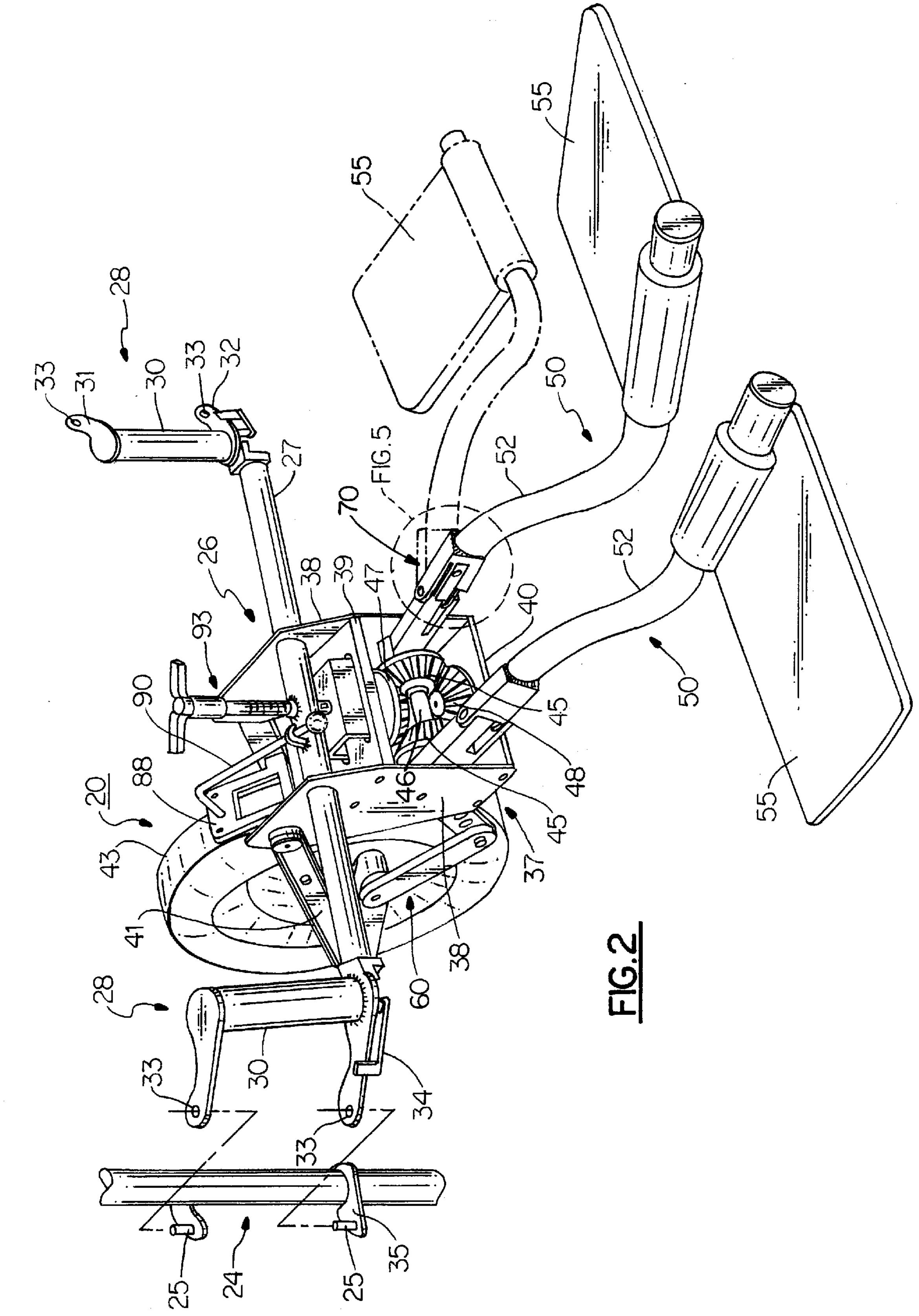
FIG. 2 is a perspective view of the therapeutic apparatus illustrated in FIG. 1.

An auxiliary therapeutic unit, generally referenced 20, is removably mounted upon the front of the main frame of the chair. The auxiliary unit, as herein depicted in the drawing is detachably mounted upon the main frame of the wheelchair, however, it should be evident from the disclosure below that the auxiliary therapeutic unit may be permanently secured to the wheelchair without departing from the teachings of the present invention. As best illustrated in FIG. 2, the vertical risers 27 of the frame of most present day wheelchairs are spaced apart when the chair is unfolded a predetermined distance to permit the chair to pass through door openings and the like. In addition, most conventional wheelchairs are further equipped with male mounting brackets 35 located on each of the two front risers of the chair frame. Each bracket includes a pair of vertically disposed lugs 25 that are adapted to removably receive therein leg supports (not shown) which may be required to support one or both of the patient's lower limbs. Here again, the brackets are of a standard size and shape so that a wide variety of leg supports can be mounted on standard size chairs provided by a number of different manufacturers.

With further reference to FIG. 2, the therapeutic unit 20 is equipped with an auxiliary frame 26 that includes a horizontally disposed cross member 27. A pair of female brackets 28 are mounted at each end of the cross member. Each female bracket further includes a vertical post 30 containing spaced apart upper and lower mounting plates 31 and 32 containing holes 33 that are capable of being slidably received upon the lug 25 of the male mounting brackets 35 situated on the main frame of the chair. A locking arm 34 is rotatably mounted in the vertical post of each female mounting bracket that is arranged to pass under the bottom lug support 35 in each male bracket to prevent the auxiliary frame from being inadvertently removed from the main frame of the chair.

Figure 3:
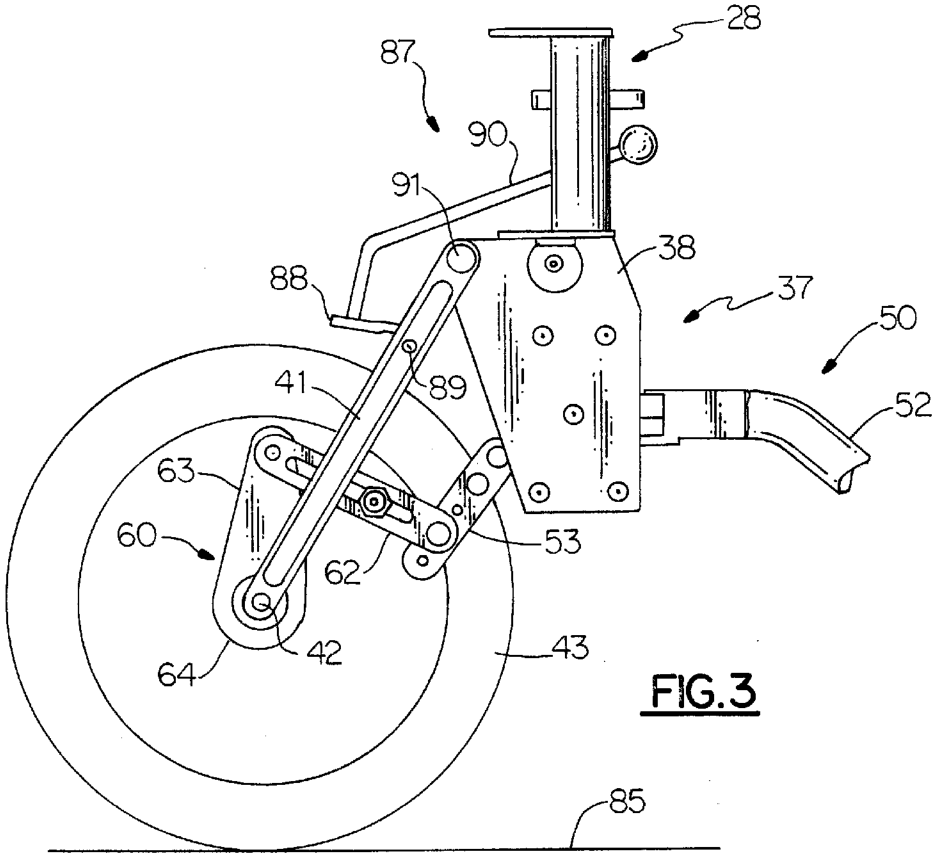
FIG. 3 is a partial enlarged side view of the therapeutic apparatus of the present invention showing one of the reciprocating lever arms of the apparatus in a down position.
Figure 4:
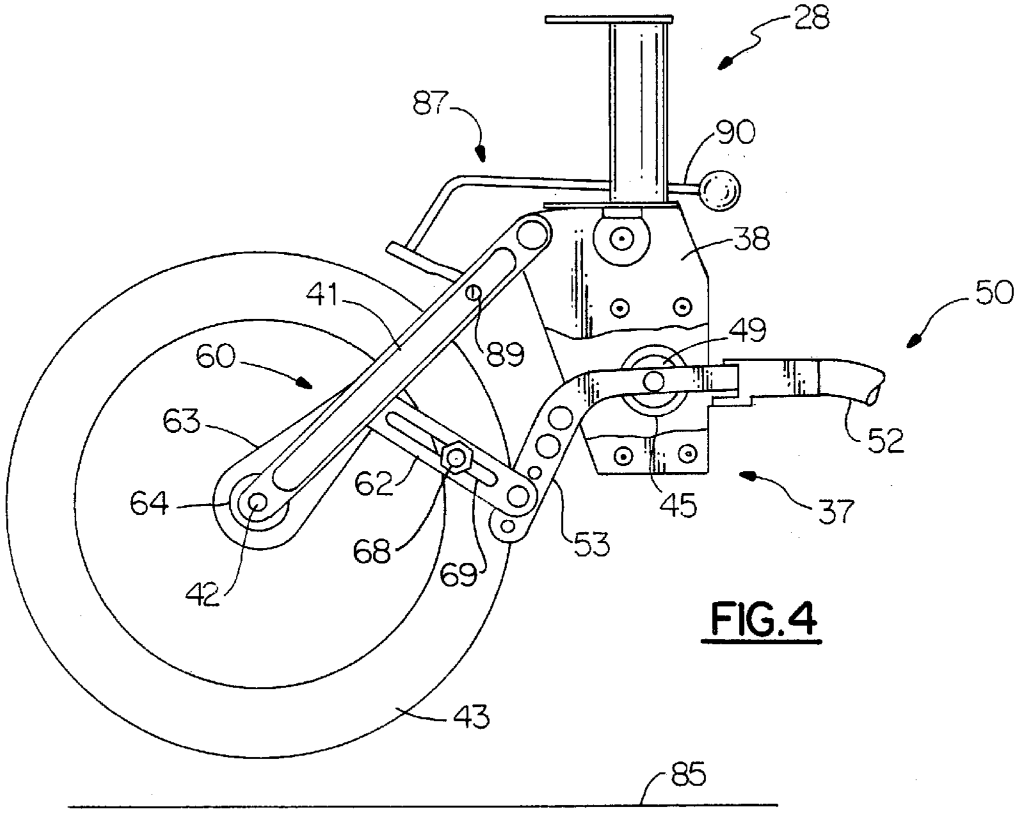
FIG. 4 is a view similar to FIG. 3 showing the lever arm in a raised position.

As further illustrated in FIGS. 2–4, the auxiliary frame includes a transmission housing 37 that is secured to the cross member 27. The transmission housing contains a pair of side walls 38—38 that are welded or otherwise joined to the cross member and a recessed top wall 39 and a bottom wall 40 (FIG. 2). A beam 41 is pivotally mounted at its upper end in each side wall of the transmission. The lower end of each beam contains a bushing (not shown) in which the shaft 42 of an auxiliary drive wheel 43 is rotatably supported. In assembly, when the auxiliary frame is mounted upon the chair frame, the auxiliary drive wheel is situated well beneath the seat of the chair and does not pose an obstruction to a patient using the chair or to the mobility of the chair.

The transmission contains a pair of spaced apart bevel gears 45—45 that are mounted for rotation about a common shaft 46. The bevel gears, in turn, are tied together by an upper idler gear 47 and a lower idler gear 48 which serve to coordinate the motion of the two bevel gears. The hub 49 of each bevel gear contains a recess in which a leg operated lever 50 is mounted so that the lever turns with the bevel gear. Each lever is arranged to pivot about the gear shaft 46 and contains a relatively long forwardly disposed arm 52 and a shorter rearwardly disposed arm 53.

As illustrated in FIG. 1, the forwardly disposed arm of the two levers are provided with leg rests 55 (FIG. 2) that enable a patient seated in the chair to use his or her legs to reciprocate each lever in a vertical plane. Through means of the bevel gear arrangement, the motion of the levers is coordinated so that one lever will move upwardly while the other is moving downwardly. The rear arm 53 of each lever is, in turn, connected to the drive shaft of the auxiliary drive wheel by means of a two bar linkage 60 consisting of a first driving link 62 that is pivotally connected to a driven link 63 that is connected to the drive shaft by a one-way clutch 64. The one-way clutch permits the auxiliary drive wheel to drive the wheel in a forward direction only.

As can be seen, reciprocating the longer lever arms of the drive system produces rotational movement of the auxiliary drive wheel through the two bar linkage thereby propelling the chair in a forward direction. As noted above, the motion of the two levers is coordinated through the drive system so that a continuous rotational force is delivered to the auxiliary drive wheel as the levers are moved up and down.

Figure 5:
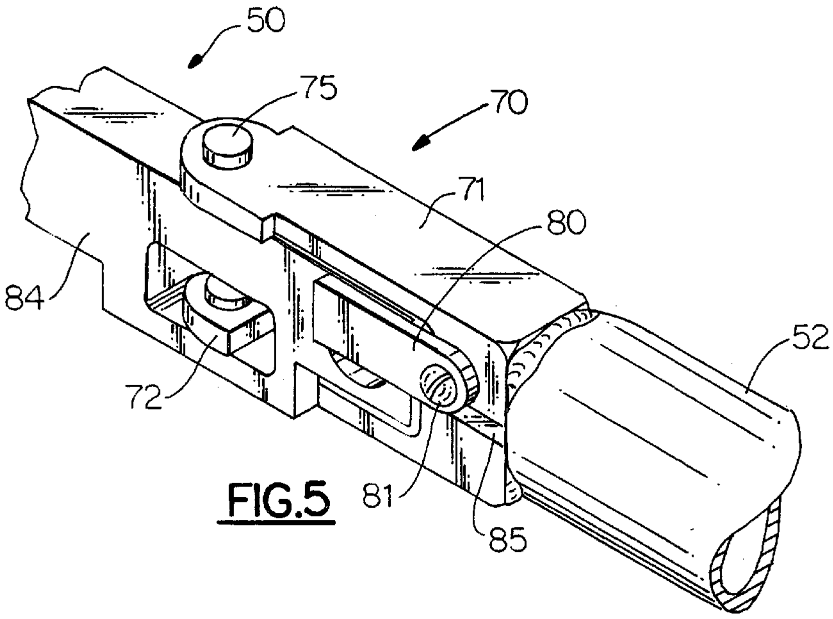
FIG. 5 is a partial perspective view showing one of the leg operated lever arms locked in a forwardly extended operative position.
Figure 6:
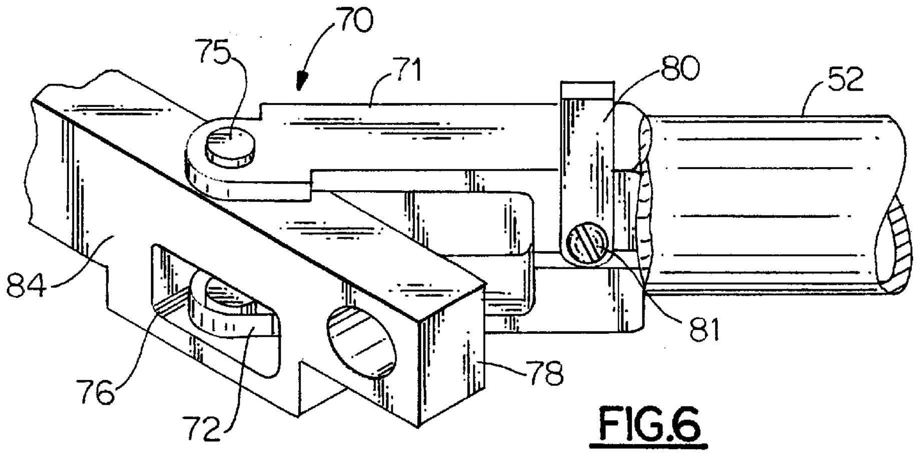
FIG. 6 is a perspective view similar to FIG. 5 showing the leg operated lever arms unlocked and turned to one side away from the chair seat.
Figure 7:
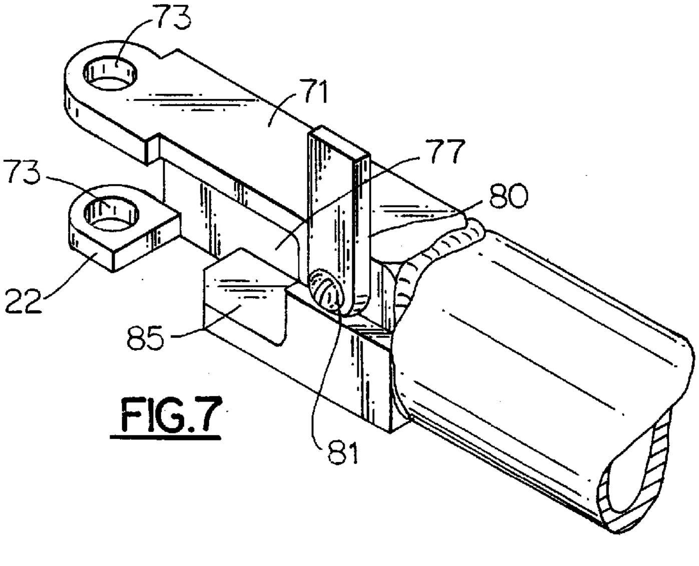
FIG. 7 is a partial perspective view of one of the leg operated lever arms more clearly illustrating the construction thereof.
Figure 8:
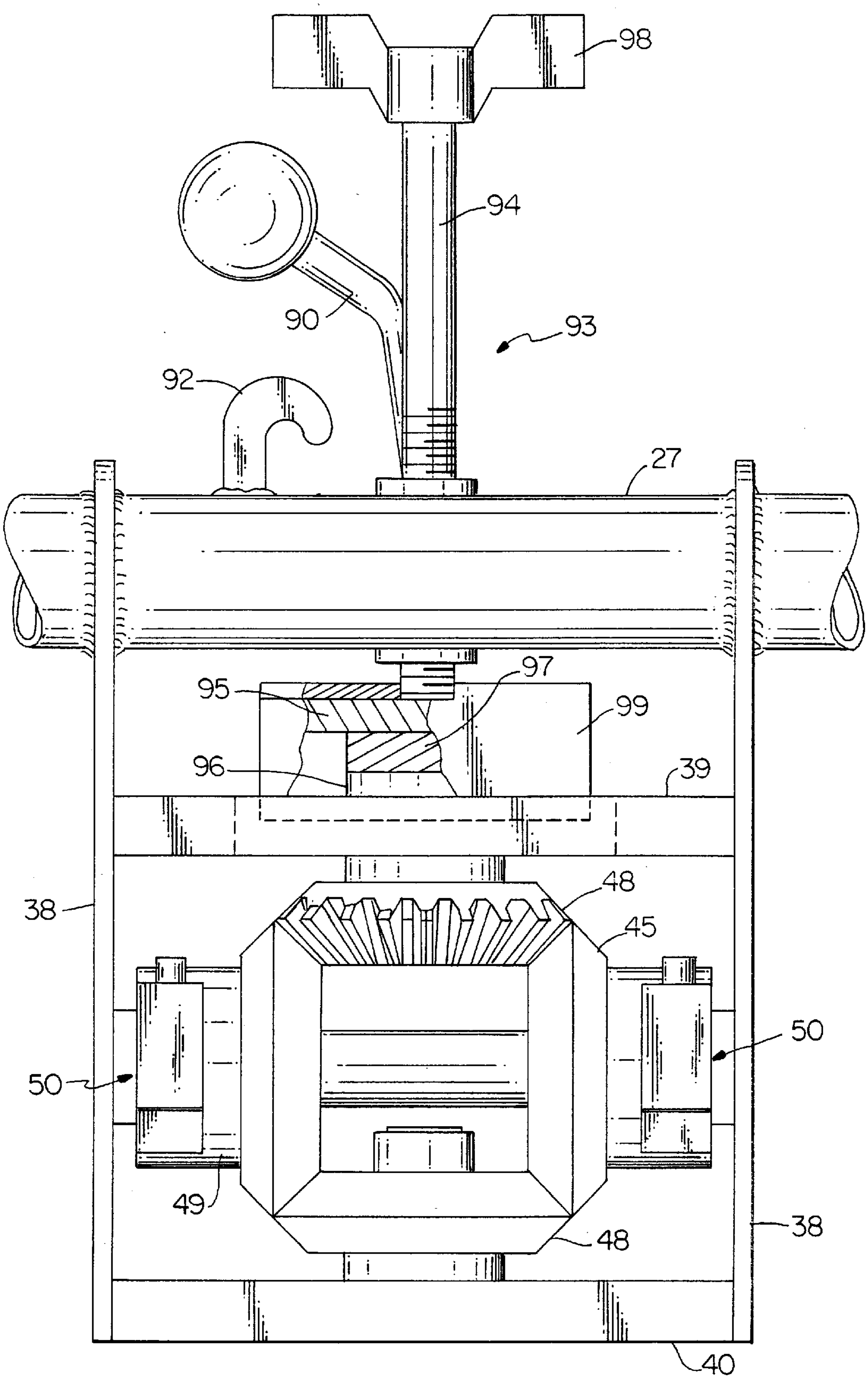
FIG. 8 is an enlarged front view more clearly illustrating the transmission and braking mechanism of the present invention.

As noted above, the forwardly protruding leg operated levers, under certain conditions, can impede a patient's ability to get into or out of the chair. The longer arm 52 of each leg operated lever is provided with a hinge, generally referenced 70, that permits either arm to be moved sideways to one side or the other of the chair seat. As illustrated in FIGS. 5–7, the arm 52 of each lever has a pair of opposed flanges 71 and 72 formed therein in which axially aligned holes 73 are bored or otherwise machined. The flanges in assembly, are adapted to fit into the body 84 of each lever and vertically aligned pivot pins 75 and 76 are passed through the flange holes and secured in the lever so that the arm 52 can rotate about the pins. The arm 52 is equipped with a stop surface 77 that is arrested against the side wall 78 of the lever body when the arm 52 is brought into co-axial alignment with the body of the lever as shown in FIG. 5. The arm 52 contains a latch 80 that is rotatable about screw 81 so that the latch can move between an open vertical position as shown in FIG. 6 and a closed or locked position as shown in FIG. 5. The arm 52 is provided with a horizontally disposed shoulder upon which the latch rests when placed in the locked position. One leg rest 55 is shown in phantom outline in FIG. 1 moved back about the hinge.

The distal end of each leg operated lever contains a foot rest 50 upon which the foot of a patient seated in the chair can be supported. The lever arms 52 are contoured with a downward bend so that the patient can easily apply a downward pressure on the lever while seated in a natural position in the chair thus causing the levers to reciprocate and the auxiliary drive wheel to rotate to propel the chair at a relatively slow speed in a forward direction.

The auxiliary drive wheel normally rests in contact upon the chair support surface 85 as illustrated in FIG. 3. The auxiliary wheel can, at the option of the user, be raised from the chair support surface as illustrated in FIG. 4. When the wheel is raised, a patient in the chair can still perform therapeutic exercises while the chair remains stationary. Accordingly, the exercises can be performed in a relatively confined space. A lifting mechanism 87 is attached between the two wheel supporting beams 41. The mechanism includes a U-shaped member 88 having arms that are secured to each of the beams by threaded fasteners 89. An actuating rod 90 is secured in the base of the U-shaped member that protrudes outwardly beyond the front of the chair seat so that it can be easily grasped by someone seated in the chair. By pushing down on the actuating rod, the beams supporting the auxiliary wheel will be pivoted about pivots 91 secured in the sidewalls 38 of the transmission housing, thus bringing the wheel to an elevated position as shown in FIG. 4.

A hook-like element 92 is secured as by welding to the cross member 27 of the auxiliary frame for securing the actuating rod in a down and locked position, thus holding the auxiliary wheel in a raised condition. The actuating rod is movably supported in the base of the U-shaped member so that it can be moved laterally under the element 92.

Each driving link 62 of the two bar linkage contains an elongated slot 69 in which a threaded fastener 68 is slidably mounted. A cylindrical shaped stop is, in turn, mounted upon the fastener which is capable of riding up into contact with the beam 41 and lifting the beam, and thus the auxiliary wheel from the chair supporting surface. The positioning of the stop along the slotted hole is adjusted to match the normal physical leg stroke of a patient seated in the chair so that the stop will not come in contact with the beam during normal stroking of the levers. However, by over extending the stroke length, the patient will cause the auxiliary wheel to be raised above the support surface. Thus, in effect, rendering the one-way clutch associated with the auxiliary drive wheel ineffective in preventing the chair from moving backward. Accordingly, in the event the patient finds him or herself in a tight spot requiring rearward movement of the chair, the auxiliary wheel can be raised slightly and the main drive wheel manually operated to propel the chair in a rearward direction.

A braking mechanism generally referenced 93 is also provided in the auxiliary frame for placing a retarding load on the auxiliary wheel drive system. The amount of drag placed on the system can be adjusted by the user to match his or her capabilities so that the most effective therapeutic results can be attained. The braking mechanism is arranged to act upon the upper idler gear of the transmission and includes a threaded control rod 94 that is threaded through the cross member 27 of the auxiliary frame as shown in FIG. 9. A brake pad 95 is secured to the distal end of the control rod that is capable of riding in friction contact against the top surface of the idler gear hub 96. A second brake pad 97 may also be joined to the top of the hub to increase the friction between the hub and the control rod. The shank of the control rod extends upwardly to an elevation where it can be easily reached by a patient seated in the chair. The upper end of the rod is further equipped with a handle 98 for turning the rod in either direction. As can be seen, turning the rod downwardly will increase the drag on the drive system and thus increase the level of energy needed to rotate the auxiliary wheel. Turning the rod in the opposite direction will, of course, produce the opposite effect. A protective cover 99 is placed over the brake to prevent dirt and the like from degrading the system.

While the present invention has been particularly shown and described with reference to the preferred embodiment, it will be understood by one skilled in the art that various changes in detail may be effected therein without departing from the spirit and scope of the invention as defined by the claims.

What is claimed is:

1. A wheel chair for therapeutically treating a patient seated therein that includes:

a main chair frame for supporting a front entry seat and a pair of main drive wheels for propelling the chair over a support surface, an auxiliary frame attached to the main frame containing an auxiliary drive wheel that is located under the chair seat, a pair of leg operated levers mounted in the auxiliary frame that have arms that extend forwardly of said chair seat, a drive means mounted in said auxiliary frame for connecting the levers to the auxiliary drive wheel so that the auxiliary drive wheel is rotated as the levers are reciprocated in a vertical plane, and pivot means associated with each of said levers about which the forwardly extended arms of each lever can be pivoted between a first operative position wherein the lever arms extend forwardly of the chair seat and a second inoperative position wherein the arms are moved to a position to one side of the chair seat whereby free ingress and egress to the seat is provided for a patient using the chair.

2. The wheelchair of claim 1 wherein said pivot means includes a releasable latch means for locking the lever arm in said operative position.

3. The wheelchair of claim 2 wherein said pivot means further includes a stop for registering said lever arm in said operative position.

4. The wheelchair of claim 1 wherein said pivot means further includes a vertically disposed pivot pin that is aligned in close proximity with a front edge of said chair seat.

5. The wheelchair of claim 1 wherein said drive means further includes a driven bevel gear secured to each lever arm for rotation about a common horizontal axis and an upper and a lower idler gear arranged to rotate about a common vertical axis for coordinating the movement of said lever arms so that as one arm moves upwardly as the other arm moves downwardly.

6. The wheelchair of claim 5 wherein said upper idler gear includes a hub arranged to rotate about said vertical axis and a manually operated brake means for placing a friction load upon said hub.

7. The wheelchair of claim 6 wherein said brake means includes a first brake pad secured to said hub and a second brake pad mounted for adjustment in the auxiliary frame by a threaded rod whereby by turning said shaft, said second brake pad is moveable into friction contact against said first brake pad.

8. The wheelchair of claim 7 wherein said threaded rod contains a handle means located beneath a front edge of the chair seat for turning said shaft.

9. The wheelchair of claim 5 that further includes a lifting fork for supporting the auxiliary drive wheel in the auxiliary frame, said fork being rotatably mounted in said auxiliary frame between a first position wherein the wheel rests in contact with said support surface and a second position wherein said wheel is raised out of contact with the support surface.

10. The wheelchair of claim 9 that further includes an activating means that includes a lifting arm mounted beneath the chair seat that is depressible by a patient seated in the chair to move the lifting fork into the second position.

11. The wheelchair of claim 10 that further includes a releasable latch for securing the lifting arm in a depressed condition to hold the auxiliary drive wheel in the second position.

12. The wheelchair of claim 9 wherein each lever arm is connected to the shaft of the auxiliary drive wheel through a two bar linkage and a one-way clutch so that the auxiliary drive wheel moves the chair in a forward direction.

13. The wheelchair of claim 12 wherein each two bar linkage contains an adjustable stop that can be selectably positioned to contact the lifting fork and lift said auxiliary drive wheel when the associated lever is reciprocated beyond a given point.

14. The wheelchair of claim 1 that further includes a pair of spaced apart female connectors mounted on the auxiliary frame that are arranged to removably engage a pair of male connectors on the main frame of the chair for removably mounting the auxiliary frame on said main frame.

15. The wheelchair of claim 14 wherein said each male connector includes a pair of vertically disposed coaxially aligned lugs and each female connector includes a pair of spaced apart coaxially aligned holes for receiving the lugs of the male connector therein.

* * * * *